Aug. 29, 1967     R. H. POORMAN     3,338,585
TOOL HOLDER CONSTRUCTION
Filed Feb. 8, 1965
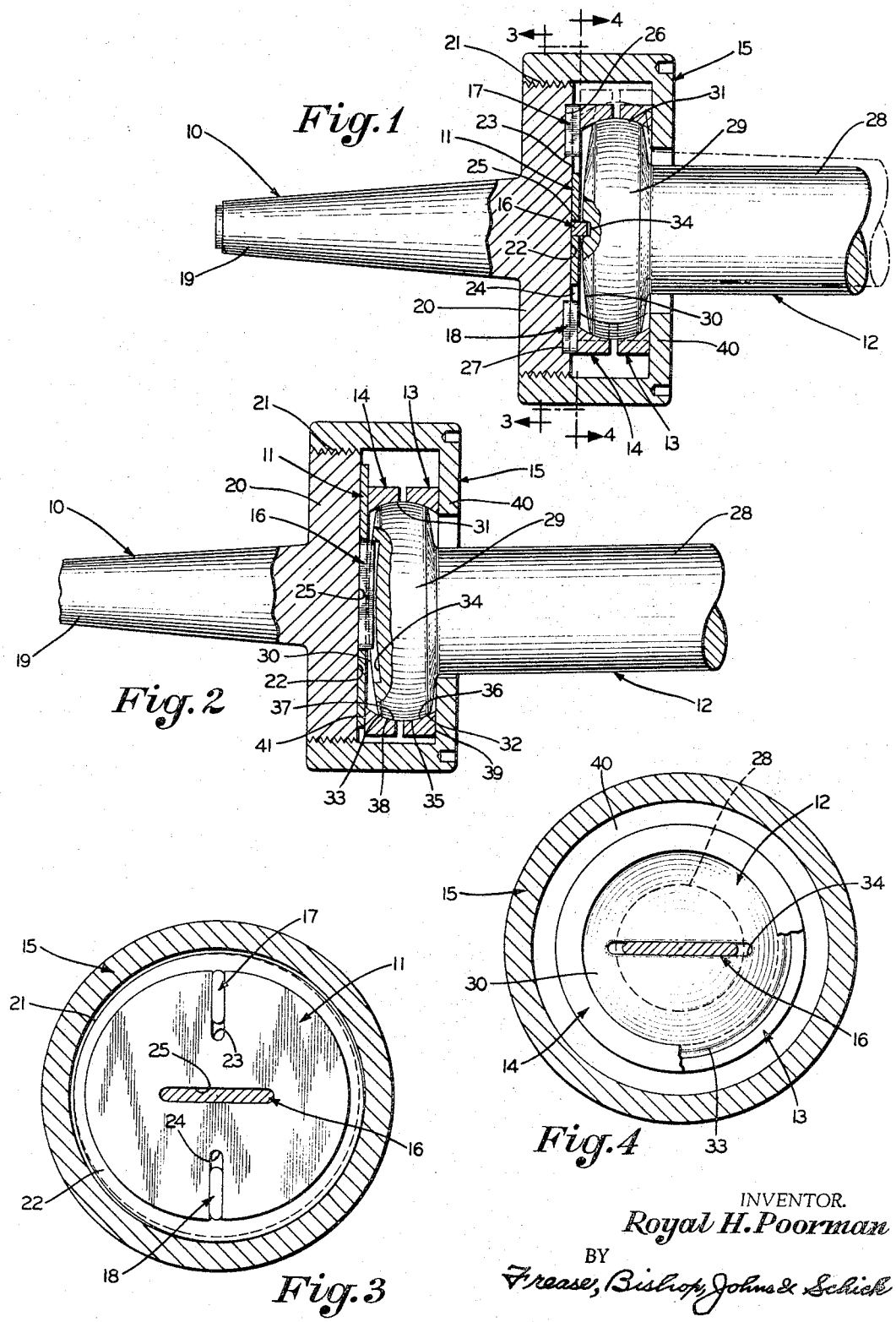
INVENTOR.
Royal H. Poorman
BY
Frease, Bishop, Johns & Schick
ATTORNEYS United States Patent Office 3,338,585
Patented Aug. 29, 1967

3,338,585
TOOL HOLDER CONSTRUCTION
Royal H. Poorman, 6055 Wiclif Drive NE.,
Canton, Ohio 44721
Filed Feb. 8, 1965, Ser. No. 430,928
4 Claims. (Cl. 279—16)

ABSTRACT OF THE DISCLOSURE

A self-aligning tool holder construction for use on machine tools, such as turret lathes and the like, having a mounting member with a forward flat surface having spaced, diametrically opposed radial grooves therein, keys located in said grooves, a radial plate slidably abutting the forward surface of the mounting member and having elongated radial slots slidably receiving the keys, and a central diametric slot at right angles thereto, and a key in the central slot. A tool holder is provided having a convex arcuate rear surface with a central radial groove therein which receives the central diametric key. The tool holder has a convex arcuate side surface circular in cross-section. Spaced positioning rings with arcuate concave surfaces surround the arcuate side surface of the tool holder, and an annular clamping member clamps the parts in adjusted position.

My invention relates to improvements in tool holder construction, and more specifically to a tool holder formed for convenient and accurate alignment of the tool held therein with a workpiece.

Even more specifically, my invention relates to a self-aligning tool holder which may be conveniently used on machine tools, such as turret lathes and the like, for quickly and easily aligning the particular tool being used with the workpiece and despite the usual slight misalignments of the machine tool caused by wear.

Many prior forms of floating tool holders have been provided for the purpose of attempting to accurately align the particular tool being held with the workpiece being worked upon, none of which have been completely satisfactory. Although certain of these prior constructions have included adjustments for both axial and radial alignment, which are required if true total alignment is to be accomplished, these constructions have been extremely complicated, not only requiring a great amount of time for making such alignment adjustments, but also being relatively expensive from the cost standpoint.

It is, therefore, a general object of the present invention to provide an improved tool holder construction which overcomes the disadvantages of the prior constructions.

It is a primary object of the present invention to provide an improved tool holder construction with which the necessary adjustments for both axial and radial alignment may be quickly and easily accomplished in a minimum amount of time.

It is a further object of the present invention to provide an improved tool holder construction with which, during release of the clamping means thereon, the tool holder is self-aligning, so that after such self-alignment, it is merely necessary to secure the clamping means in order to maintain the tool holder in exact proper aligned position.

Finally, it is an object of the present invention to provide an improved tool holder construction satisfying the above objects, yet which may be fabricated at a cost much less than has been heretofore possible.

These and other objects are accomplished by the parts, constructions, arrangements, combinations and subcombinations comprising the present invention, a preferred embodiment of which—illustrative of the best mode in which applicant has contemplated applying the principles—is set forth in the following description and illustrated in the accompanying drawings, and which is particularly and distinctly pointed out and set forth in the appended claims forming a part hereof.

In general terms, the improved tool holder construction comprising the present invention may be stated as including a mounting member formed with a forward radially extending surface, a flat radially extending plate positioned slidably and axially abutting the mounting member radial surface, and first key means engaged between the radial plate and mounting member limiting relative radial slidable movement between the plate and mounting member along one diameter. This first key means is preferably in the form of diametrically opposite, radially extending key members engaged between the radial plate and mounting member at or near the periphery of the radial plate, with the slots receiving these keys in one or both of the radial plate and mounting member being radially elongated, so as to provide the limited relative radial slidable movement between the plate and mounting member along the one diameter.

Still further, the improved construction includes a tool holder having a convex arcuate generally radially extending rearward end surface and a convex arcuate generally axially extending side surface circular in radial cross-section, with this convex side surface being of minimum diameter at axially spaced forward and rearward ends and a maximum diameter intermediate these ends. This tool holder is positioned relative to the radial plate and mounting member with the arcuate end surface closely forwardly adjacent the radial plate, and with second key means engaged between the tool holder and radial plate for rockable movement of the tool holder in all radial directions relative to the radial plate and mounting member through rockable movement of the tool holder arcuate end surface axially adjacent the radial plate.

This second key means is further constructed and arranged for limiting relative radial slidable movement between the tool holder and radial plate along a diameter substantially perpendicular to the foregoing one diameter. Furthermore, this second key means is preferably in the form of a centrally located key engaged in axially aligned slots between the tool holder and radial plate, at least one of which slots is elongated, and which slots extend along the diameter which is substantially perpendicular to the foregoing one diameter.

Still additionally, the construction includes positioning ring means for co-operating to clamp the tool holder in a pre-set position relative to the mounting member, with this positioning ring means at least including a forward positioning ring mounted slidably partially telescoped over a forward part of the tool holder side surface, and an arcuate inner surface substantially conforming to said forward part of the tool holder side surface and extending axially forwardly beyond the side surface forward end. Also, the positioning ring means preferably includes a rearward positioning ring slidably partially telescoped over a rearward part of the tool holder side surface, and having an arcuate inner surface substantially conforming to the rearward part of the tool holder side surface and extending axially rearwardly beyond the side surface rearward end. This second positioning ring is further constructed and arranged rearwardly slidably abutting the radial plate and maintaining the tool holder arcuate end surface closely forwardly adjacent to but spaced from the radial plate.

Finally, the construction includes selectively operable clamping means operably connected to the mounting member and engaged with the forward positioning ring for forcing said forward positioning ring axially rearwardly and against the tool holder side surface to clamp the holder in pre-set position relative to the mounting member. In the case where the positioning ring means also includes the rearward positioning ring, this clamping means forces the forward positioning ring axially rearwardly and against the tool holder side surface, to force the tool holder side surface against the rearward clamping ring and the rearward clamping ring against the radial plate, while the tool holder end surface remains closely adjacent to but spaced from the radial plate.

By way of example, an embodiment of the improved tool holder construction of the present invention is illustrated in the accompanying drawings forming a part hereof, wherein like numerals indicate similar parts throughout the several views, and in which:

FIG. 1 is a fragmentary side elevation, with parts broken away and in section, and showing an adjusted position of the tool holder in broken lines;

FIG. 2, a fragmentary side elevation similar to FIG. 1 but taken at right angles to FIG. 1, and showing the tool holder in an adjusted position;

FIG. 3, a vertical view, part in elevation, looking rearwardly in the direction of the arrows 3—3 in FIG. 1; and FIG. 4, a vertical sectional view, part in elevation and with parts broken away, looking forwardly in the direction of the arrows 4—4 in FIG. 1.

Referring to the drawings, an embodiment of the improved tool holder construction of the present invention is illustrated therein and includes a mounting member, generally indicated at 10, a radial plate, generally indicated at 11, a tool holder, generally indicated at 12, a forward positioning ring, generally indicated at 13, a rearward positioning ring, generally indicated at 14, a clamping member, generally indicated at 15, a first key member, generally indicated at 16, and second key members, generally indicated at 17 and 18. All parts of the tool holder construction may be formed of usual materials such as steel or the like.

The mounting member 10 is formed with the usual tapered engagement portion 19 for being received in usual manner into the tailstock of a machine tool, such as a turret lathe or the like. Furthermore, this mounting member 10 is formed with a forward cylindrical portion 20 which is exteriorly threaded as at 21 and has a forward, preferably flat, radially extending surface 22.

The radial plate 11 is also preferably flat, being elliptic and of substantially uniform thickness throughout, with the diameter of this radial plate being a determined amount smaller than the diameter of the cylindrical portion 20 of mounting member 10. Further, the radial plate 11 is formed with the diametrically opposed and radially spaced key slots 23 and 24, with these key slots preferably opening radially outwardly at the periphery of the radial plate. Still further, the radial plate 11 is formed with the preferably centrally located radial key slot 25 which extends along a diameter of the radial plate preferably substantially perpendiculr to the one diameter along which the key slots 23 and 24 extend.

Diametrically opposed radially extending key slots 26 and 27 are also formed in the forward radial surface 22 of mounting member 10, and the radial plate 11 is positioned slidably abutting this mounting member forward radial surface 22 with the radial plate key slots 23 and 24 axailly aligned with the mounting member key slots 26 and 27. The second key members 17 and 18 are received engaged in the mounting member key slots 26 and 27 and the radial plate key slots 23 and 24, so as to be engaged between the mounting member 10 and radial plate 11. It will be noted that at least the key slots 23 and 24 in radial plate 11 are of greater radial lengths than the second key members 17 and 18 for providing a limited relative radial slidable movement of the radial plate 11 against the mounting member forward radial surface 22 and along the diameter extending through the second key members 17 and 18.

Obviously, the key slots 26 and 27 of mounting member 10 may also be radially elongated or may be radially elongated rather than the key slots 23 and 24 of radial plate 11. The important thing is that relative radial slidable movement is provided between the forward radial surface 22 of mounting member 10 and the radial plate 11 along the one diameter, while still maintaining a connection insuring against relative rotation therebetween.

The tool holder 12 is generally cylindrical in configuration and is formed with a usual tool holding portion 28 which may be provided with any usual tool fastening means, such as a Morse taper or the like, for mounting the usual tools, such as drills, reamers, etc. Furthermore, tool holder 12 is formed with the radially enlarged clamping end portion 29 having a convex arcuate generally radially extending rearward end surface 30 and a convex arcuate generally axially extending side surface 31, which side surface is circular in radial cross-section having minimum diameters at axially spaced forward and rearward ends 32 and 33 and a maximum diameter intermediate these ends.

The rearward end surface 30 of the tool holder clamping end portion 29 is formed with a preferably centrally located radially extending key slot 34, which key slot extends along a diameter axially aligned with the center key slot 25 of radial plate 11 and, therefore, along a diameter substantially perpendicular to the one diameter along which the outer key slots 23 and 24 of radial plate 11 extend. Also, the key slot 34 on the tool holder rearward end surface 30 is of greater radial length than the center key slot 25 on radial plate 11, and the side edges of key slot 34 are slightly radiused for purposes to be hereinafter described.

Thus, with the tool holder 12 positioned as shown in FIGS. 1 and 2, and the rearward end surface 30 of tool holder 12 forwardly adjacent the radial plate 11, the first key member 16, having a radial length approximately equal to the radial length of the center key slot 25 of radial plate 11, may be positioned engaged partially in the radial plate center key slot 25 and partially in the tool holder key slot 34, while this first key member 16 slidably abuts rearwardly against the mounting member forward radial surface 22. Due to the fact that the tool holder key slot 34 is of greater radial length than both the radial plate center key slot 25 and first key member 16, this mounts the tool holder 12 for limited radial movement along the diameter within which the key slots and first key member extend, while at the same time, due to the slight radiused sides of the tool holder key slot 34, this tool holder is also mounted rockable in all radial directions relative to the radial plate 11 and mounting member 10.

As previously described with reference to the engagement of the second key members 17 and 18 between the mounting 10 and radial plate 11, in this engagement of the first key member 16 between the radial plate 11 and tool holder 12, it is actually immaterial which of the radial plate center key slot 25 or tool holder key slot 34 is of greater radial length than the first key member 16, or whether both of these key slots are of such greater radial length. The important point is that limited radial movement is permitted between the radial plate 11 and the tool rearward end surface 30 along the diameter described, while at the same time, relative rotation between radial plate 11 and tool holder 12 is prevented.

The forward positioning ring 13 is formed with a concave arcuate inner surface 35 substantially conforming to the forward part 36 of the tool holder side surface 31, and the rearward positioning ring 14 is formed with the concave arcuate inner surface 37 substantially conforming to the rearward part 38 of the tool holder side surface 31. Furthermore, these inner surfaces 35 and 37 of the forward and rearward positioning rings 13 and 14 are formed such that with the forward positioning ring 13 partially telescoped over the forward end 32 of the tool holder side surface 31 and the rearward positioning ring 14 partially telescoped over the rearward end 33 of the tool holder side surface 31, each of the forward and rearward positioning rings 13 and 14 will axially overhang the respective forward and rearward ends 32 and 33 of the tool holder side surface 31, as shown in FIGS. 1 and 2.

The forward positioning ring 13 is formed with the forward axially extending surface 39, which surface slidably abuts the annular radially inwardly extending flange 40 of the annular clamping member 15, and which clamping member is rearwardly threadably engaged with the mounting member threads 21 spaced outwardly of radial plate 11, tool holder 12, and positioning rings 13 and 14. Also, the rearward positioning ring 14 is formed with the radially extending rearward surface 41 which slidably abuts the radial plate 11.

It is preferred that the rearward positioning ring 14 and the inner surface 37 thereof are formed so as to retain the tool holder rearward end surface 30 spaced from a few thousandths to a few hundredths of an inch from the radial plate 11, depending on the size of the overall construction, while the first key member 16 maintains the before described engagement therebetween. Also, it is necessary that the axially extending flange 40 on the clamping member 15 has inner dimensions a determined amount larger than the outer dimensions of the tool holding portion 28 on tool holder 12 in order to permit the previously described rockable and slidable radial movement of the tool holder relative to the radial plate 11, as well as relative slidable radial movement of the radial plate 11 and tool holder 12 along the mounting member forward radial surface 22.

Thus, with the construction described, when the clamping member 15 is slightly loosened on the mounting member 10, the tool holder 12 may be rocked radially, as well as moved slidable radially relative to the relative plate 11 as limited by the first key member 16. At the same time, this movement of the tool holder 12 is permitted in other radial directions by the simultaneous movement of the radial plate 11 therewith, as determined by the second key members 17 and 18 limiting the relative slidable movement between radial plate 11 and mounting member 10, all of which combined, gives the tool holder virtually universal adjustment relative to the mounting member 10.

When the desired adjustment has been made for aligning the particular tool held in the tool holder 12 with a workpiece, the clamping member 15 may then be tightened axially rearwardly on the mounting member 10, which will clamp the forward positioning ring 13 rearwardly against the tool holder outer side surface 31, force this side surface to clamp rearwardly against the rearward positioning ring 14, and force the rearward positioning ring against the radial plate 11, to thereby clamp the radial plate against the tool holder 12.

In this manner, the tool holder 12 will be securely clamped against any movement relative to the mounting member 10 and this will retain this tool holder in its particular adjusted position. Furthermore, such clamping without disturbing the adjusted position of the tool holder 12 is aided by the fact that slight axial clearance is maintained between the tool holder rearward end surface 30 and the radial plate 11, even during such clamping.

In the case where extremely precise alignment of the tool holder 12 is not required, but relatively close reasonable alignment will suffice, it is possible to completely eliminate the rearward positioning ring 14, so that the mounting member rearward end surface 30 will axially abut the radial plate 11 and with all of the other elements of the construction acting in the same manner previously described. With the elimination of the rearward positioning ring 14 and during clamping of the tool holder 12 relative to the mounting member 10, it is possible to incur slight alignment errors due to the expanse of tool holder rearward end surface 30 directly contacting and abutting the radial plate 11 wherein slight surface imperfections and variations can slightly disturb the alignment.

It should be understood, however, that most of the advantages of the tool holder construction of the present invention may be obtained whether or not the rearward positioning ring 14 is included in the construction. Furthermore, it should be understood that use of the term "adjacent" in describing the positioning relationship between radial plate 11 and the tool holder radial end surface 30 is intended to mean abutting or the slight axial spacing described.

In the foregoing description, certain terms have been used for brevity, clearness and understanding but no unnecessary limitations are to be implied therefrom, because such words are used for descriptive purposes herein and are intended to be broadly construed.

Moreover, the embodiment of the improved construction illustrated and described herein is by way of example and the scope of the present invention is not limited to the exact details of construction shown.

Having now described the invention, the construction, operation and use of a preferred embodiment thereof, and the advantageous new and useful results obtained thereby, the new and useful constructions and reasonable mechanical equivalents thereof obvious to those skilled in the art are set forth in the appended claims.

I claim:

1. Tool holder construction including a mounting member having a forward radial surface with diametrically spaced radial grooves therein, a radial plate positioned slidably axially abutting the mounting member radial surface, said plate having elongated radial slots through its outer edges, first key means mounted in said grooves and slidably received in said slots for limiting relative radial slidable movement between said plate and mounting member along one diameter, a tool holder having a convex arcuate generally radially extending rearward end surface and a convex arcuate generally axially extending side surface circular in radial cross-section, the tool holder side surface being of minimum diameter at axially spaced forward and rearward ends and a maximum diameter intermediate said ends, the tool holder being positioned with the arcuate end surface closely forwardly adjacent the radial plate, there being a central radial slot in said plate at right angles to said elongated radial slots and a central radial groove in said arcuate end surface, second key means engaged between the groove in the tool holder and the central radial slot in the radial plate for rockable movement of the tool holder in all radial directions relative to the radial plate and mounting member through rockable movement of the tool holder arcuate end surface axially adjacent the radial plate, the second key means being constructed and arranged for limiting relative radial slidable movement between the tool holder and radial plate along a diameter substantially perpendicular to said one diameter, positioning ring means for co-operating to clamp the tool holder in a pre-set position relative to the mounting member including a forward positioning ring mounted slidably partially telescoped over a forward part of the tool holder side surface and having an arcuate inner surface substantially conforming to said forward part of the tool holder side surface and extending axially forwardly beyond the side surface forward end, and selectively operable clamping means operably connected to the mounting member and engaged with the positioning ring for forcing said positioning ring axially rearwardly and against the tool holder side surface to clamp the tool holder in said pre-set position relative to the mounting member.

2. Tool holder construction as defined in claim 1 in which the positioning ring means includes a rearward positioning ring slidably partially telescoped over a rearward part of the tool holder side surface and having an arcuate inner surface substantially conforming to said rearward part of the tool holder side surface and extending axially rearwardly beyond the side surface rearward end, the rearward positioning ring being constructed and arranged rearwardly slidably abutting the radial plate and maintaining the tool holder arcuate end surface closely forwardly adjacent to but spaced from the radial plate; and in which the clamping means forces the forward positioning ring axially rearwardly and against the tool holder side surface to force the tool holder side surface against the rearward clamping ring and the rearward clamping ring against the radial plate while the tool holder end surface remains closely adjacent to but spaced from the radial plate.

3. Tool holder construction as defined in claim 1 in which the first key means engaged between the radial plate and mounting member includes radially spaced diametrically opposed keys extending aligned with said one diameter; and in which the second key means engaged between the tool holder and radial plate includes a centrally disposed key extending aligned along said diameter substantially perpendicular to said one diameter.

4. Tool holder construction as defined in claim 1 in which the positioning ring means includes a rearward positioning ring slidably partially telescoped over a rearward part of the tool holder side surface and having an arcuate inner surface substantially conforming to said rearward part of the tool holder side surface and extending axially rearwardly beyond the side surface rearward end, the rearward positioning ring being constructed and arranged rearwardly slidably abutting the radial plate and maintaining the tool holder arcuate end surface closely forwardly adjacent to but spaced from the radial plate; in which the clamping means forces the forward positioning ring axially rearwardly and against the tool holder side surface to force the tool holder side surface against the rearward clamping ring and the rearward clamping ring against the radial plate while the tool holder end surface remains closely adjacent to but spaced from the radial plate; in which the first key means engaged between the radial plate and mounting member includes radially spaced diametrically opposed keys extending aligned with said one diameter; and in which the second key means engaged between the tool holder and radial plate includes a centrally disposed key extending aligned along said diameter substantially perpendicular to said one diameter.

References Cited

UNITED STATES PATENTS

| | | | |
|---|---|---|---|
| 1,823,032 | 9/1931 | Vilieg | 279—16 |
| 1,854,632 | 4/1932 | Skeel | 279—16 |
| 2,431,476 | 11/1947 | Hall | 279—16 |
| 2,898,118 | 8/1959 | Smith | 279—16 |

ROBERT C. RIORDON, *Primary Examiner.*